Oct. 14, 1930.  J. C. NEVILLE  1,778,119
BOBBER ATTACHMENT FOR HOLDING FISH LINES
Filed Jan. 31, 1929
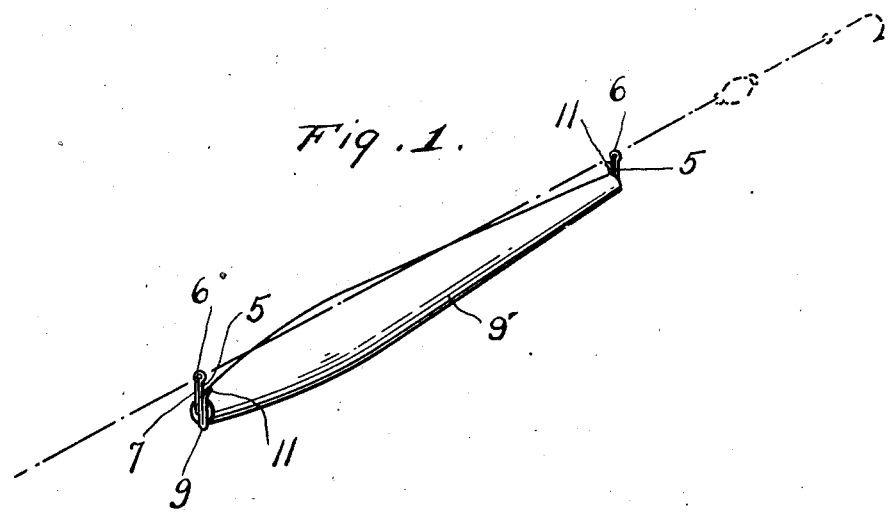
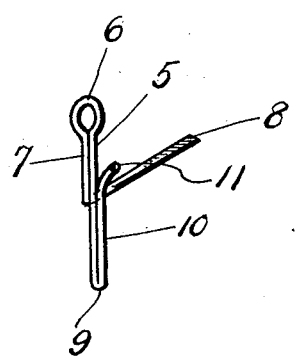
Inventor
J. C. Neville
By Clarence A. O'Brien
Attorney Patented Oct. 14, 1930

1,778,119

UNITED STATES PATENT OFFICE

JOSEPH C. NEVILLE, OF NORWALK, OHIO

BOBBER ATTACHMENT FOR HOLDING FISH LINES

Application filed January 31, 1929. Serial No. 336,532.

The present invention relates to a device made of spring wire and the like for attaching a bobber to a fishing line and has for its prime object to provide a device of this nature whereby the bobber may be attached so that the line may move therethrough or so that the bobber has the line fixed thereto.

A still further very important object of the invention resides in the provision of a device of this nature which is exceedingly simple in its construction, inexpensive to manufacture, thoroughly efficient and reliable in use.

With the above and numerous other objects in view as will appear as the description proceeds, the invention resides in certain novel details of construction as will be hereinafter more fully described and claimed.

In the drawing:

Figure 1 is a perspective view of a bobber showing my devices at the ends thereof, Figure 2 is a perspective view of one of the devices.

Referring to the drawing in detail it will be seen that each device comprises a member made from a single strand of wire or the like, said strand including an elongated body 5 merging at one end into an eye 6 with an extension 7 along the body 5 and merging into a laterally disposed flattened portion 8 to be inserted in the end of the bobber 9' and the other end of the body 5 remote from the eye 6 is bent upon itself, as at 9, to provide an extension 10 along the body 5 and terminating in an offset end 11.

The end extension 8 may be inserted in the end of the bobber to prevent the device from turning in respect to the bobber. The fishing line may be inserted through the eye 6 so that the bobber may slide on the line or the line may be inserted between the body 5 and the extension 10 so that the bobber is fixed to the line.

The offset end 11 makes it easy to insert the end in the latter described position. It is of course understood that there is one of these devices at each end of the bobber.

When the line is passed through the eye 6 of the device the fishing line is preferably provided with a knot too large to pass through the bobber. This knot is provided at the desired place to attain the desired depth one wishes to fish when casting out. When the line is fixed to the bobber, of course, the same is to be used for still fishing.

Another very important feature of the invention resides in the provision of means whereby the bobber may be attached to or detached from any particular place on the line without disturbing the fish hook or fisher.

It is thought that the construction, utility and advantages of this invention will now be quite apparent to those skilled in this art without a more detailed description thereof. Changes in the details of construction may be resorted to without departing from the spirit or scope of the invention as hereinafter claimed.

Having thus described my invention, what I claim as new is:

1. A device of the class described formed from a single strand of material, including an intermediate body portion of elongated construction merging at one end into an eye, which, in turn, merges into an extension in abutment with approximately one-half of the body, and then terminating in a lateral end extension and said body remote from said eye being bent upon itself to provide an extension along approximately the other half of the body, said last referred to extension terminating in an offset end.

2. In a device for securing a fishing line to a bobber, said device being formed from a single strand of material including an elongated body portion formed at one end to provide an eye, which eye in turn merges into an extension projecting at right angles to the body, said projection being adapted for insertion into the bobber for securing said body portion transversely of the bobber, and said body portion remote from said eye being bent upon itself to provide an extension parallel to said body.

In testimony whereof I affix my signature.

JOSEPH C. NEVILLE.